United States Patent [19]

Sakai

[11] Patent Number: 4,795,288
[45] Date of Patent: Jan. 3, 1989

[54] YOKE MEMBER CONNECTING DEVICE IN WINDSHIELD WIPER

[75] Inventor: Masao Sakai, Yono, Japan

[73] Assignee: Nippon Wiperblade Co., Ltd., Saitama, Japan

[21] Appl. No.: 79,160

[22] Filed: Jul. 29, 1987

[30] Foreign Application Priority Data

Jul. 31, 1986 [JP] Japan ............... 61-116841[U]

[51] Int. Cl.⁴ .................................... F16D 1/00
[52] U.S. Cl. ........................ 403/24; 403/153; 403/161; 15/250.42; 411/514
[58] Field of Search ............... 403/161, 24, 153, 154, 403/162; 15/250.42, 250.35, 250.32; 411/514

[56] References Cited

U.S. PATENT DOCUMENTS

| | | | |
|---|---|---|---|
| 1,416,700 | 5/1922 | Fenicle | 411/514 X |
| 3,061,866 | 11/1962 | Krohm | 15/250.35 |
| 3,670,355 | 6/1972 | Sakamoto | 15/250.35 X |
| 3,844,663 | 10/1974 | Prette | 403/161 X |

*Primary Examiner*—Andrew V. Kundrat
*Attorney, Agent, or Firm*—Wenderoth, Lind & Ponack

[57] ABSTRACT

A device for connecting pivotally two yoke members of a windshield wiper. Each yoke member has a cross-section including two generally vertical side walls and a top wall connecting the upper ends of the side walls, and the yoke members are overlappingly disposed relative to each other. The device comprises a pivot pin passing through aligned openings in the side walls of the two yoke members, and the pivot pin is divided into plural portions in the cross-section thereof at the location inner side of the side walls of inner yoke member, with the plural portions being separated from one another in the radially outward directions thereby forming a large diameter portion.

5 Claims, 1 Drawing Sheet

U.S. Patent   Jan. 3, 1989   4,795,288
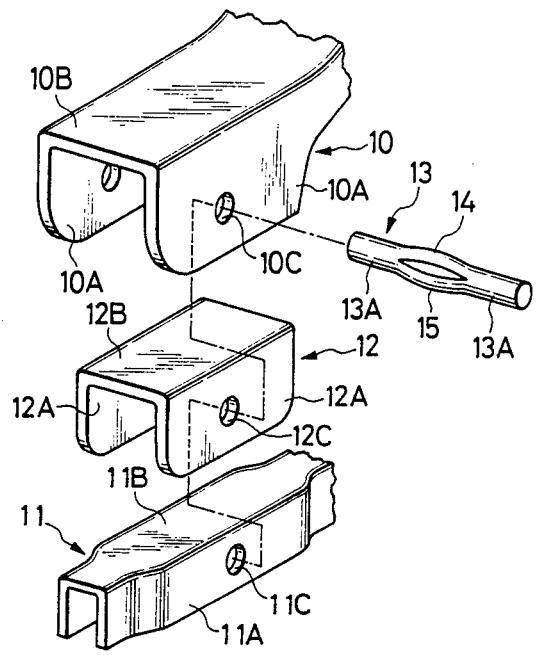
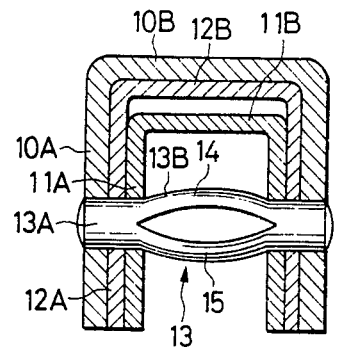
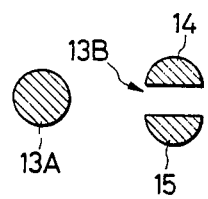
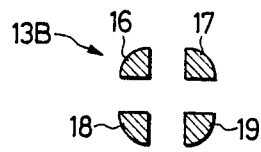
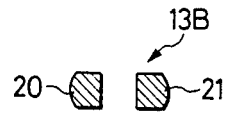
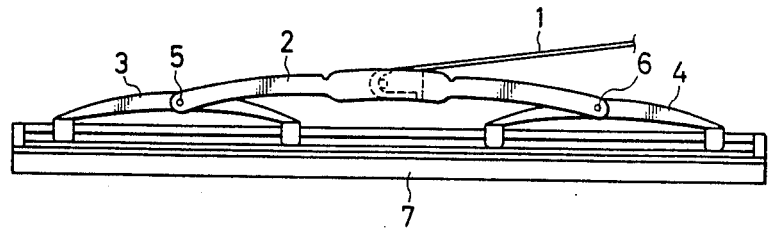

YOKE MEMBER CONNECTING DEVICE IN WINDSHIELD WIPER

FIELD OF THE INVENTION

The present invention relates to a windshield wiper and, particularly to a yoke member connecting device in the windshield wiper.

DESCRIPTION OF PRIOR ART

FIG. 6 shows a typical prior art windshield wiper for use in a vehicle, wherein a yoke member 2 connected to a wiper arm 1 (the base portion thereof, which is mounted pivotally on a stationary part of the vehicle and is connected to a wiper motor, is not shown in the drawing) is connected to yoke members 3 and 4. The yoke members 3 and 4 are pivotally mounted on opposite ends of the yoke member 2 through pivot pins 5 and 6 respectively, and support a rubber blade 7. Usually, the pivot pins 5 and 6 are rivets thereby requiring a troublesome and time consuming riveting operation.

Japanese Patent Publication No. 55-8371 shows a device omitting the riveting operation, but the assembling operation therein cannot be simplified.

Japanese Utility Model Application No. 60-91158 shows a device including a pivot pin having tapered portions on opposite ends thereof and resilient bearing portions formed on at least one of the yoke members, so that the pivot pin can be inserted and assembled by simply pushing axially. However, there are problems in the design and material of the resilient bearing portion and in the manufacturing cost.

The present invention has been made in view of the circumstances aforementioned, and aims to provide a yoke member connecting device which is simple in construction and low in cost.

SUMMARY OF THE INVENTION

According to the invention, there is provided a device for connecting pivotally first and second yoke members of a windshield wiper, each yoke member having a cross-section including generally vertically extending side walls and a generally horizontally extending top wall connecting the upper ends of the side walls, with the side walls of the second yoke member being located inside of the side walls of the first yoke member, the device comprising a pivot pin passing through aligned openings in the side walls of the first and second yoke members, and the cross-section of the pivot pin is divided into plural portions at the location inside of the side walls of the second yoke member, with the plural portions being separated from one another in the radially outward direction thereby forming a large diameter portion.

Preferably, the plural portions cooperate to form a circle the diameter of which is substantially equal to that of the remaining portion of the pivot pin when said portions are displaced toward each other, so that the pivot pin can simply be inserted through the openings in the side walls in the yoke members.

Preferably, the plural portions engage with the inner circumference of the aligned openings in the side walls of the second yoke member thereby preventing the movement of the pivot pin in the axial directions, and further, the pivot pin does not rotate relative to the second yoke member and the pivotal movement occurs only between the first yoke member and the pivot pin, which is advantageous in supporting the torque, and which can reduce the frictional wear.

BRIEF DESCRIPTION OF THE DRAWINGS

Further objects and effects of the invention will become apparent from the following detailed description in conjunction with the drawings, in which:

FIG. 1 is an exploded view of a yoke member connecting device according to an embodiment of the invention;

FIG. 2 is a sectional view of the device of FIG. 1;

FIG. 3 is a sectional view of pivot pin of FIG. 1;

FIG. 4 is a sectional view similar to FIG. 3, but showing a modified form;

FIG. 5 is a sectional view similar to FIG. 3, but showing a further modified form, and FIG. 6 is a schematic view of a prior art windshield wiper.

DETAILED DESCRIPTION OF PREFERRED EMBODIMENTS

FIGS. 1-3 show a first embodiment according to the invention, which comprises a first yoke member 10, a second yoke member 11, a spacer member 12 and a pivot pin 13. The yoke members 10 and 11 respectively correspond to the yoke members 2 and 3 in FIG. 6, and are shown partially. It will be understood that the invention is not limited to the windshield wiper of the type shown in FIG. 6, and can be applied to any desired type.

The yoke member 10 has a cross-section including generally vertically extending side walls 10A and 10A and a generally horizontally extending top wall 10B connecting the upper end of the side walls 10A and 10A. Similarly, the yoke member 11 has a cross-section including generally vertically extending side walls 11A and 11A and a generally horizontally extending top wall 11B connecting the upper end of the side walls 11A and 11a. It will be noted the top and side walls need not necessarily have flat, sharply bent, equal thickness and solid configuration as shown in the drawings.

The spacer member 12 has a cross-section including two side walls 12A and 12A engaging with the inner surfaces of the side walls 10A and 10A of the first yoke member 10 and with the outer surfaces of the side walls 11A and 11A of the second yoke member 11, and a top wall 12B connecting the upper end of the side walls 12A and 12A. The spacer member 12 is preferably formed of antifriction material such as synthetic resin. As shown in FIG. 2, the top wall 12B of the spacer member 12 engages with the inner surface of the top wall 10B of the first yoke member 10 and is spaced from the upper surface of the top wall 11B of the second yoke member 11, so that the first yoke member 10 and the spacer member 12 rotate relative to the second yoke member 11. However, the spacer member 12 may be omitted, or the spacer member may be provided to rotate relative to the first yoke member 10 or to rotate relative to first and second yoke members 10 and 11.

There are provided in side walls 10A, 10A, 11A, 11A, 12A and 12A of first and second yoke members 10 and 11 and the spacer member 12 aligned openings 10C, 10C, 11C, 11C, 12C and 12C of equal diameter.

A pivot pin 13 extends through the aligned openings 10C, 10C, 11C, 11C, 12C and 12C. The pivot pin 13 has small diameter portions 13A and 13A at opposite ends and a large diameter portion 13B at the central portion. The large diameter portion 13B consists of two generally semi-circular portions 14 and 15 as shown in FIG. 3. The portions 14 and 15 are separated in the radially outward direction thereby forming a large diameter portion. The pivot pin 13 is preferably formed of a synthetic resin material, but may be formed of metal. When the portions 14 and 15 are displaced toward each other until they come in contact, the diameter will be reduced so as to become reduced substantially equal to that of the small diameter portion 13A, and the pivot pin can easily be inserted through or extracted from the openings 10C, 12C and 11C axially, so that the assembling or disassembling operation is very easy.

The portions 14 and 15 engage with the inner circumference of the aligned openings 11C and 11C in the side walls 11B and 11B of the second yoke member 11 thereby preventing the movement of the pivot pin 13 in the axial directions.

FIG. 4 shows a modified form wherein the large diameter portion 13B of the pivot pin is divided into four quarter-circles 16, 17, 18 and 19.

FIG. 5 shows a further modified form wherein the large diameter portion 13B consists of two flattened semi-circular portions 20 and 21, and which portions do not make a circle when the portions are moved toward each other, but the maximum diameter at that condition is nearly equal to that of the aligned openings, so that the function is equal to that of the preceding embodiments.

The pivot pin 13 described as above takes the form shown in such as FIG. 2 by its own resiliency. However, the pivot pin may take the form as shown for, example, in FIG. 2 by plastic deformation.

As described heretofore, the pivot pin according to the invention will not accidentally come out of the aligned openings since the large diameter portion reliably engages with the side walls of the second yoke member, and the assembling operation is very easy.

What is claimed is:

1. In combination, first and second yoke members of a windshield wiper, each yoke member having a cross-section including generally vertically extending side walls and a generally horizontally extending top wall connecting the upper ends of the side walls, with the side walls of said second yoke member being located inside the side walls of said first yoke member and the respective side walls having holes therein aligned with corresponding holes in the other side walls, and a device for pivotally connecting said first and second yoke members and being constituted by a pivot pin extending through the aligned openings in the side walls of said first and second yoke members, said pivot pin having the cross-section extending between the side walls of the second yoke member divided into a plurality of portions which are separated from one another in the radially outward direction for forming a large diameter portion which tightly engages with the inner circumference of said aligned openings in the side walls of said second yoke member, thereby preventing movement of said pivot pin in the axial directions, and the opposite ends of said pivot pin being substantially flush with the outer surfaces of the side walls of said first yoke member.

2. The combination as set forth in claim 1, wherein said plurality of portions are two semicircular portions.

3. The combination as set forth in claim 1, wherein said plurality of portions are four quarter-circle portions.

4. The combination as set forth in claim 1, wherein said plurality of portions cooperate to form a circle the diameter of which being substantially equal to that of the remaining portion of the pivot pin when said portions are displaced toward each other.

5. The combination as set forth in claim 1, wherein said pivot pin is formed of a resilient material.

* * * * *